Sept. 9, 1941.  G. P. HALL  2,255,383
BRAKE
Filed Feb. 21, 1938  2 Sheets-Sheet 1
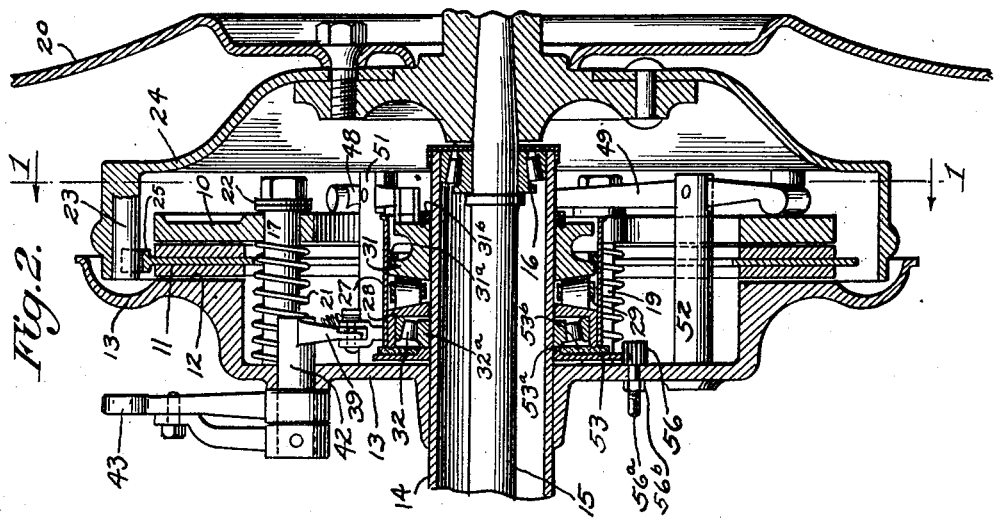
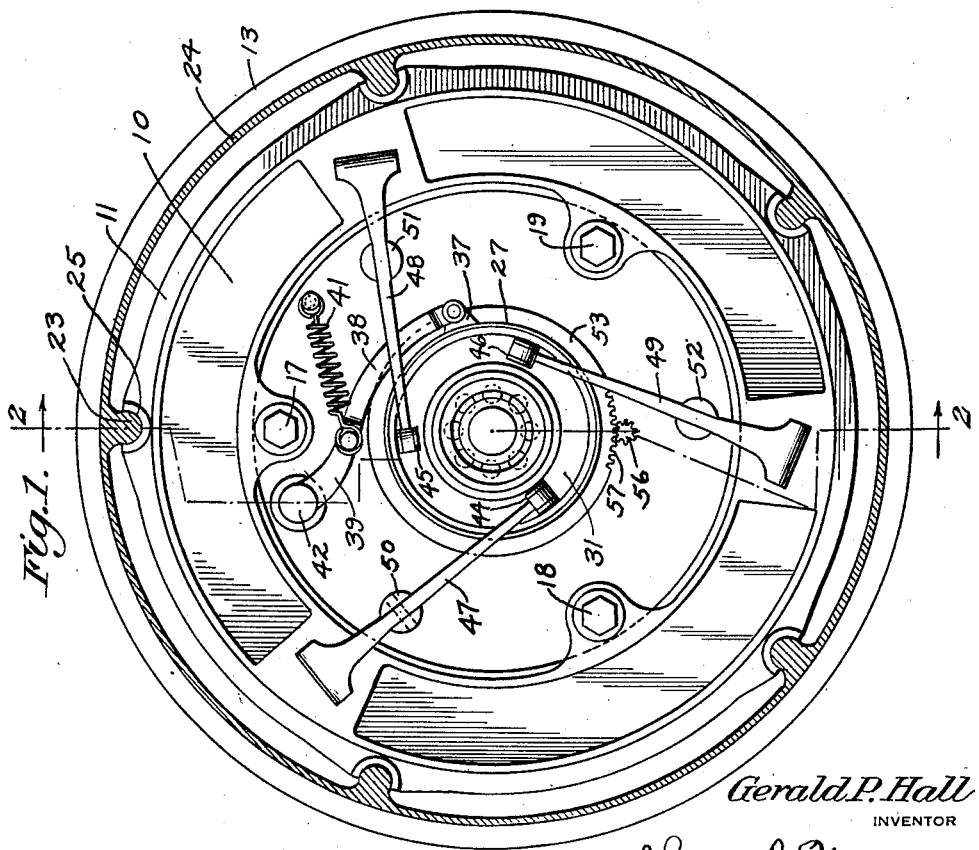
Gerald P. Hall
INVENTOR
Joseph Farley
ATTORNEY Sept. 9, 1941.　　　　G. P. HALL　　　　2,255,383
BRAKE
Filed Feb. 21, 1938　　　2 Sheets-Sheet 2
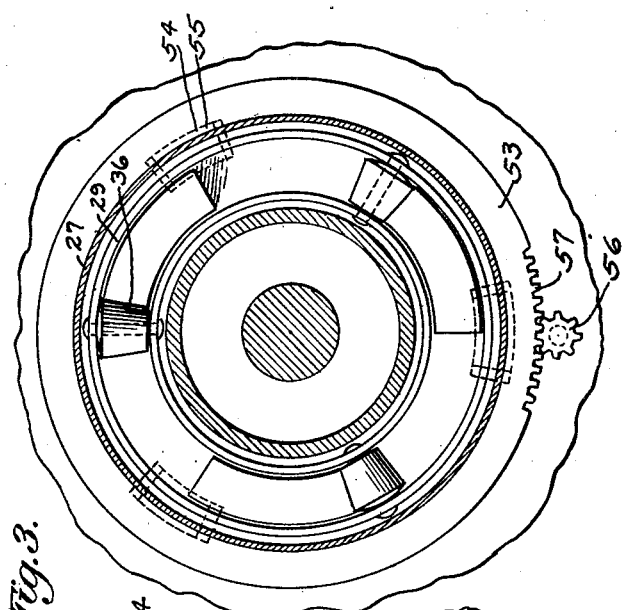
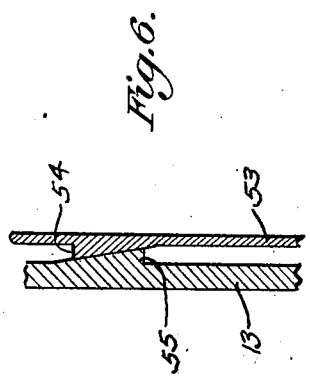
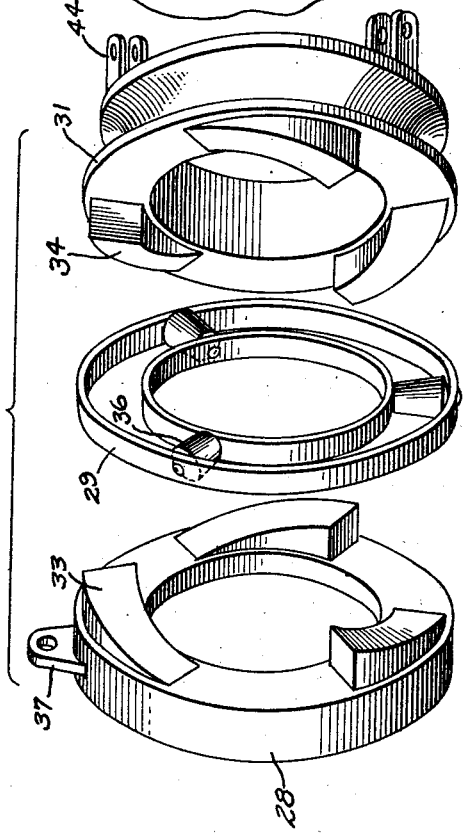
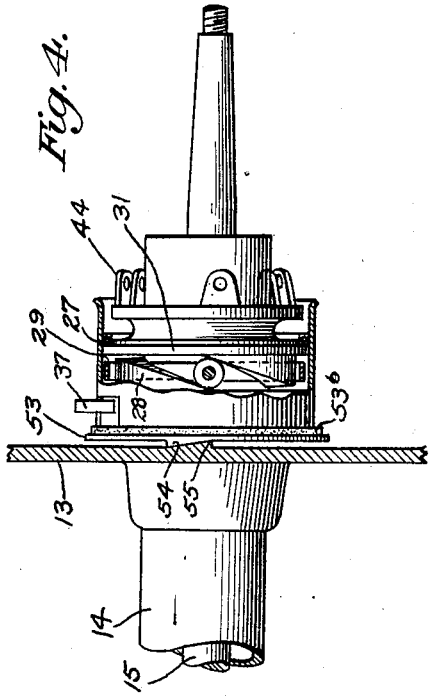
Gerald P. Hall
INVENTOR
BY Joseph Farley
ATTORNEY Patented Sept. 9, 1941

2,255,383

UNITED STATES PATENT OFFICE 2,255,383

BRAKE

Gerald P. Hall, Monmouth, Maine

Application February 21, 1938, Serial No. 191,606

5 Claims. (Cl. 188—72)

This invention relates to brakes primarily designed for use on automotive vehicles. In order to provide a satisfactory brake for use on automobiles it is very important that the unit be compact with a minimum number of parts and provide adequate equalized braking action with a minimum of effort. Much development work has been done in an attempt to construct satisfactory brakes which equalize the braking action on each wheel and the many different methods used in an attempt to solve this problem indicate that no one method is entirely satisfactory.

It is therefore a primary object of the present invention to provide a brake mechanism suitable for use on automotive vehicles which will make possible adequate braking action on each wheel of the vehicle and be easily adjusted to equalize the braking action on each wheel.

It is a further object to provide a brake wherein a larger braking surface is provided still maintaining a standard size of brake housing on each wheel.

It is another object to provide a brake mechanism with individual adjustment of the contacting parts on each wheel to effect equalization of the relative braking effort so operable as to accomplish the adjustment without change in the position of other adjacent parts of each operating linkage.

It is a further object to provide a disk type brake wherein the movable parts effecting the contacting of the disks is contained in an enclosed compact central unit.

It is another object to provide a disk type brake suitable for automotive use operating upon the three plate disk principle wherein a movable plate is pressed against a floating disk to effect frictional contact between the movable plate and one side of the floating disk, and between the opposite side of the floating disk and a stationary member.

It is a further object to provide a brake member with such an effective adjustment at each brake unit that adequate equalization may be assured by such individual adjustment without interference with other means which may be used to equalize parts of an actuating mechanism employed to operate a plurality of brake units.

The above and other objects of the invention will appear more fully from the following detailed description and by reference to the drawings forming a part hereof and wherein:

Fig. 1 shows a section through the brake housing and the several parts which would be exposed after removal of the wheel and brake drum, the section being taken on the line 1—1 of Fig. 2.

Fig. 2 is a section taken on the line 2—2 of Fig. 1 and furnishes a general view of the co-acting parts of the brake mechanism.

Fig. 3 is a section through the central portion of the cam operating mechanism and shows the roller unit in position, as well as the adjusting mechanism.

Fig. 4 is an assembly view partly in section of the central cam mechanism which operates the brake unit.

Fig. 5 shows the three essential parts of the cam operating mechanism disassembled but in the relative position occupied during operation.

Fig. 6 is a section showing the inclined faces used to provide a change in adjustment on rotation of the adjusting plate.

Referring to the drawings, and particularly to Fig. 2, it is noted that the brake herein disclosed uses three disks, the frictional contact of which provides the braking action, namely, a movable plate 10, a floating disk 11, and a fixed surface 12 formed on the inside of a stationary backing plate 13, which backing plate is secured to a tubular axle housing 14 in which housing a rotating wheel axle 15 is shown supported by the bearing 16. The particular unit shown is assembled on a rear wheel, but it is understood that appropriate changes in the construction could be made for use on a front wheel. The movable plate 10 is slidably mounted on three pins 17, 18 and 19 (Fig. 1) which are threaded into, or otherwise secured to the backing plate 13 and project inwardly of the housing formed about the recessed portion of the backing plate, as shown in Fig. 2. Between the backing plate and the inner surface of the movable plate 10, springs 21 are mounted on each of the pins 17, 18 and 19 in such manner that the expansion of these springs forces the movable plate 10 outwardly on the pins 17, 18 and 19 against suitable stops provided at the end thereof, shown as nuts and washers 22 in Fig. 2. By this construction the springs normally hold the plate 10 a sufficient distance away from the floating disk 11 and the fixed surface 12 to always allow the floating disk to rotate freely between the movable plate 10 and the fixed surface 12.

The floating disk 11 is non-rotatably secured to the wheel by being locked to but mounted to slide axially on suitably formed projections 23 on the inside of the housing 24 which is secured to rotate with a wheel 20. A detailed construction for mounting of the floating disk 11 is shown best by reference to Fig. 1 wherein it appears that each of the projections 23 fits into a suitable recess 25 on the periphery of the disk. As appears in Fig. 1, there are five projections and corresponding recesses spaced around the circumference in the construction used for illustration. The thickness of the movable plate at the point where recesses 25 are cut is sufficient to provide a bearing surface so that when the plate is set into the housing it will be retained in a definite position and will therefore slide without binding. This feature is quite important in that the mere use of slots in a thin plate without sufficient thickness to provide a bearing for a guide would result in a very inefficient construction for the purpose required. It is also important that sufficient bearing area be provided because of the fact that the entire braking action is transmitted through the several projections 23 and the corresponding recesses 25. It is, of course, understood that the number of these projections and recesses, as well as the size of the individual bearings, may be varied depending upon the energy to be absorbed by the brake. The fixed surface 12 is formed by turning an annular surface on the backing plate 13 and since the backing plate is stationary no further special construction is necessary.

I have so far described the mounting of the floating disk 11, for rotation with the wheel, and adjacent fixed braking surfaces provided by the inner surface of the movable plate 10 and the fixed surface 12. A braking action is effected when the movable plate 10, which is free to slide but not to rotate, is given a sliding movement to produce a contact between the two surfaces of the floating disks and the adjacent fixed braking surfaces.

The mechanism provided for sliding the movable plate will now be described. Its essential parts are housed in a central casing 27. The major parts are three in number, an inner cam carrying member 28, a roller retaining member 29, and an outer cam carrying member 31. The detailed construction of these three members is best disclosed in the perspective view, Fig. 5, where the three are shown disassembled but in their proper relative positions. The inner cam carrying member 28 is supported for limited rotation on a combination radial and thrust roller bearing 32, this construction being shown in Fig. 2. The outer cam carrying member 31 is mounted for sliding and rotating movement around the tubular axle housing 14 also shown in Fig. 2. By reference to Fig. 5 it appears that each of the cam carrying members 28 and 31 have inclined cam surfaces, i. e. 33 on cam carrying member 28, and similar but oppositely disposed cam surfaces 34 on cam carrying member 31. The aforementioned cam surfaces are so positioned in a circular path as to contact similarly spaced tapered rollers 36 carried by roller retaining member 29. Three sets of cams and rollers are shown in Fig. 5 spaced equally around the circular path of the unit and it is apparent that although three units provide an adequate balance, a greater or smaller number could be used.

As shown in Figs. 1, 4 and 5, a lug 37 projects radially from the outer surface of the inner cam carrying member 28 for the purpose of connecting actuating links 38, 39 shown in Fig. 1, a spring 41 being provided to hold the linkage in position to the right in Fig. 1. The links 38, 39 are operated by shaft 42 and lever arm 43 by conventional brake operating mechanism and it is apparent on inspection of Fig. 1 that the rotation of shaft 42 in a clockwise direction will move the lug 37 which actuates cam member 28 in such direction that the member 28 will be rotated in a counter-clockwise direction, as viewed in Fig. 1. As will be apparent on consideration of Figs. 4 and 5, the aforementioned rotation of member 28 will cause the outer cam carrying member 31 to slide to the right (Figs. 2 and 5), this result being accomplished because of the combined action of the cam members 33 and 34 with the interposed tapered rollers 36. The outer face of the cam carrying member 31 has three pairs of lugs 44, 45, 46 to which are secured three actuating levers 47, 48, 49, each of which is fulcrumed on a post 50, 51, 52, these posts extending from and being secured to the backing plate 13. The position of each of these posts 50, 51, 52 is such that the length of the arm on each actuating lever from the fulcrum post to the connecting lug on member 31 is greater than the opposite extending arm which contacts the movable plate 10. It is apparent that the arrangement is such that there is a mechanical advantage afforded by the position of the fulcrum on the levers and that the sliding movement of the cam carrying member 31 will effect such movement of the levers 47, 48, 49 as to move the plate 10 against the action of the springs 21 and slide it on the pins 17, 18, and 19, thereby to actuate the brake by bringing the frictional surfaces on members 10, 11 and 12 in contact.

For the purpose of providing an adjustment to equalize the braking unit with other units with which it may be used and also to compensate for wear of the brake lining, there is provided an adjusting plate 53 positioned between the backing plate 13 and bearing 32. The adjusting plate 53, as shown in Fig. 6, has a plurality of wedge shaped bosses 54 provided thereon which engage similar but oppositely disposed wedge shaped bosses 55 on the backing plate 13. This construction of engaging wedge shaped bosses will cause sliding movement of the adjusting plate 53 on rotation thereof. As shown in Fig. 2, the adjusting plate is in contact with the sliding inner race 32a of the bearing 32 and therefore any sliding movement of adjusting plate 53 is transmitted through bearing 32 to slide the inner cam carrying member 28. The adjusting plate 53 is normally held against rotation by a stub tooth pinion 56, shown in Figs. 2 and 3, which operates in a rack 57 cut into a short segment of the periphery of the adjusting plate, as shown in Fig. 3. The wedge shaped bosses 54 and 55 are also shown in Fig. 3, three pairs of these bosses being provided in the construction as illustrated. It is apparent that rotation of the stub tooth pinion 56 will cause sliding movement of the entire cam unit in an axial direction and thus change the position of the actuating lever relative to the movable plate 10. It is noted that the pinion 56 can be adjusted from the exterior of the housing by rotation of the stub shaft 56a and may be secured in adjusted position by the lock nut 56b.

It is noted that the adjusting plate 53 is provided with an annular boss 53a which carries the thrust from the adjusting plate to the sliding inner race 32a of the bearing 32. This boss 53a also serves to center a grease retaining felt washer 53b which is positioned between the end of the casing 27 and the adjusting plate 53. As also shown in Fig. 2, two wiper rings 31a and 31b are provided, 31a being secured to the outside inner end of the cam carrying member 31, and 31b being secured to the inside outer end of the cam carrying member 31, these rings providing a joint between casing 27 and member 31 to complete a grease-tight unit in which the various elements of the cam unit work with adequate lubrication and freedom from dust or other foreign matter.

In operation the lever 43 is connected to such conventional actuating mechanism as may be employed on the vehicle. It is understood that a unit such as shown in the drawings is employed at each wheel where braking action is desired. A forward movement of this lever 43 shown in Fig. 2 produces clockwise movement of the shaft 42 as the shaft is viewed in Fig. 1 and actuates the linkage 38, 39, which connects with lug 37 to rotate the inner cam carrying member 28. As will be apparent from an inspection of Fig. 1, the direction of rotation of the inner cam carrying member 28 will be in a counterclockwise direction (as viewed in Fig. 1) and it is apparent on inspection of Figs. 1 and 5 that the result of such rotation will be to slide the outer cam carrying member 31 in a direction to the right, as shown in Fig. 2. Such a movement actuates the three levers 47, 48, 49 on their pivots 50, 51, 52 and the outer ends of the levers exert a force on the plate 10 so that it is pushed toward the floating disk 11, thereby to cause contact between the floating disk 11, the movable plate 10 and the fixed surface 12. As previously noted, the floating disk 11 is secured to rotate with the housing 24 and the wheel 20 although the floating disk is free to slide in a direction parallel with the axis of the wheel. Therefore the aforementioned contact between the sides of the floating disk 11 and the adjacent surfaces on the plate 10 and the fixed surface 12, both of which are secured against rotation, will effect a braking action of the wheel 20.

It is to be noted that the connection of the levers 47, 48 and 49 by means of the lugs 44, 45 and 46 is so designed that the levers are in a tangential position relative to the outer cam carrying member 31 and with reference to the entire central cam unit (see Fig. 1). Because of this tangential mounting of the levers no more rotating movement of the outer cam carrying member 31 is allowed than is required by the arc movement of the levers. The same tangential connection of the levers which allows a slight rotation, as above outlined, is still effective to hold the cam carrying member from further rotation and make it effective as a sliding member to operate the brake unit when the inner cam carrying member 28 is rotated. This use of the levers to prevent rotation of the outer portion of the central cam unit simplifies construction by making it unnecessary to provide a splined connection between the cam unit 31 and the tubular housing.

For the purpose of adjustment the stub tooth pinion may be actuated to change the position of the wedge shaped bosses 54 and 55 to produce a sliding movement of the entire assembly at the center of the unit composed of the combination radial and thrust bearing 32, with its tapered roller bearings and the race, and hence the inner cam carrying member 28, the roller retaining member 29, and the outer cam carrying member 31. This will result in a different starting position for the levers 47, 48, 49 and will effect an adjustment without a material change in the position of the linkage connected to the shaft 42 since the movement is perpendicular to the linkage and the slight movement which results when the adjustment is made will be allowable because of the flexibility of the joints between the links 38 and 39.

It is an important feature of the device that the majority of the operating parts are centrally located and housed in a member covered by a casing 27 thereby assuring adequate lubrication, but with the exclusion of foreign substances which are commonly present even inside the brake housing.

The adjustment provided by the stub tooth pinion 56, which normally holds the adjusting plate 53 in position, makes possible the equalization of several brake units such as individual units for each wheel of an automobile. By rotation of the pinion 56 the brake may be adjusted to provide braking action later or earlier as desired without interference with any operating linkage which may also be independently equalized to give equal actuating movement to each brake unit.

It is contemplated that as many sets of movable and floating plates and disks may be provided as are required to provide adequate braking action in any particular installation.

Although I have described my invention as applied to a particular disclosure I do not desire to limit myself to the specific details of construction disclosed as it is evident that changes can be made in the construction without departing from the general principles of the invention.

I claim:

1. In a mechanism for operating a circumferentially located braking unit, a central operating mechanism comprising a sliding element, connections between said sliding element and said braking unt, cam means for actuating said sliding element, an actuating linkage for said cam means, and adjusting mechanism comprising an adjustable cam member for independently sliding said cam means and said sliding member in a direction perpendicular to the actuating linkage connection for said cam means whereby adjustment of said actuating mechanism is effected without disturbing the relative position of said cam means and said actuating linkage.

2. In a brake operating mechanism, a central cylindrical housing, a sliding collar forming a closure for an end of said central housing and having a circumferential surface extending therefrom, brake operating levers, pivoted connections tangentially securing the inner ends of said levers on said circumferential projecting surface of said sliding collar in such position that said slding collar is held by said levers from rotation beyond an amount sufficient to compensate for the arcuate path of movement of the ends of said levers.

3. In an operating mechanism for actuating braking units located around a circumference, a cam unit operable by limited rotative movement located centrally of said braking units, a member actuated for sliding movement by said cam unit positioned in axial alignment wtih said cam unit, a housing for said cam unit and said operating member having an end thereof formed by said sliding member and sealing means between said sliding member and said housing.

4. In a brake operating mechanism, a central sliding collar, a housing surrounding said sliding collar and having an open end closed by said collar, sealing means between the interior of said housing and said collar, levers for operating said brake mechanism on sliding movement of said collar, connections positioned on the outer surfaces of said collar effecting a tangential connection with the ends of said levers in such position as to limit the rotative movement of said collar to an amount determined by the arcuate path of the ends of said levers.

5. In a mechanism for operating a circumferentially located braking unit, a central operating mechanism comprising a sliding element, connections between said sliding element and said braking unit, and cam means for actuating said sliding element, said cam means comprising at least one oscillatable helical cam, at least one roller positioned to ride thereon and at least one helical cam fixed to said slidable element and arranged to ride on said roller, the height of said cams and the diameter of the roller being substantially the same and the cams and roller being so arranged that at one extreme of the oscillatory motion of the oscillatable cam the roller will rest at the bases of both cams and at the other extreme of the oscillatory motion of the oscillatable cam the roller will rest between the uppermost tips of the cams, thus extending the cam arrangement from a thickness approximately equal to the roller diameter to a thickness approximately equal to three times the roller diameter.

GERALD P. HALL.